Jan. 23, 1962     C. H. BURNSIDE     3,017,748
COMBINATION LIQUID AND SOLID PROPELLANT
SPIN-STABILIZED ROCKET MOTOR
Filed Jan. 2, 1959

*INVENTOR.*
C. H. BURNSIDE
BY Hudson E. Young
*ATTORNEYS*

United States Patent Office 3,017,748
Patented Jan. 23, 1962

3,017,748
COMBINATION LIQUID AND SOLID PROPELLANT SPIN-STABILIZED ROCKET MOTOR
Charles H. Burnside, Bartlesville, Okla., assignor to Phillips Petroleum Company, a corporation of Delaware
Filed Jan. 2, 1959, Ser. No. 784,816
11 Claims. (Cl. 60—35.6)

This invention relates to jet propulsion. In another aspect, it relates to a novel combination liquid and solid propellant, spin-stabilized rocket motor.

In the past fifteen years or so, great interest developed in the use of liquid propellant rocket motors and solid propellant rocket motors as means of jet propulsion. Simple rocket motors utilizing liquid propellant generally require pressurized inert gas as a means of forcing the liquid propellant into the combustion chamber, while larger liquid propellant rocket motors rely on a separate pressurizing and pumping system to inject the liquid propellant into the combustion chamber of the rocket motor. These methods of injecting the liquid propellant have several disadvantages, such as requiring costly, and somewhat unreliable, pressurizing, pumping, and injection devices, and high pressure storage tanks which limit the space available for payload. While the solid propellant rocket motors are generally simpler and more reliable than liquid propellant rocket motors, the specific impulses of the latter are generally higher.

The present invention overcomes the above-mentioned disadvantages to a great extent and has among its objects the following:

An object of this invention is to provide a spin-stabilized rocket motor. Another object is to provide a novel combination liquid and solid propellant rocket motor. Another object is to provide a spin-stabilized rocket motor loaded with liquid and solid propellants, said rocket motor capable of producing relatively high specific impulses. Another object is to provide a novel combination liquid and solid propellant rocket motor having a high combustion efficiency. Another object is to provide a liquid and solid propellant "hybrid" rocket motor that eliminates complex and somewhat unreliable pressurizing, pumping and injection devices to inject liquid fuel, oxidizer or propellant into the combustion chamber of the motor. A further object is to provide a spin-stabilized rocket motor which utilizes the centrifugal force resulting from the spinning of the motor as the means for feeding and injecting liquid fuel, propellant, or oxidizer into the combustion chamber of the motor. Other objects and advantages of this invention will become apparent to those skilled in the art from the following discussion, appended claims, and accompanying drawing in which:

Figure 1:
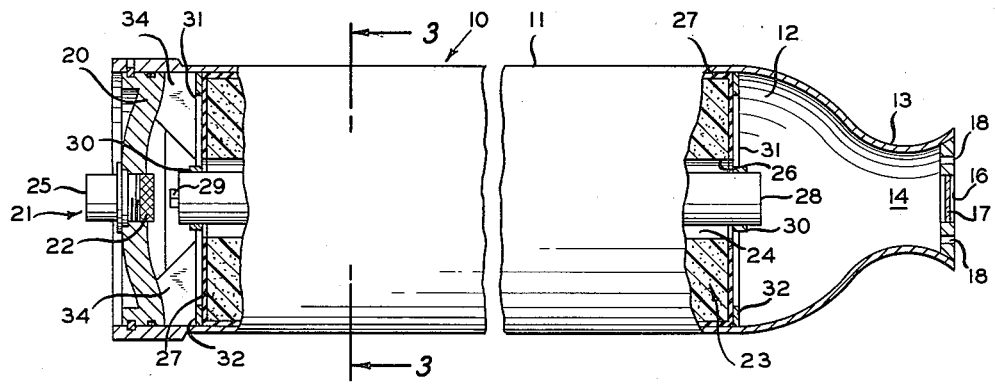
FIGURE 1 is a side elevational view, in partial section, of one embodiment of the novel combination liquid and solid propellant rocket motor of this invention.
Figures 2, 3:
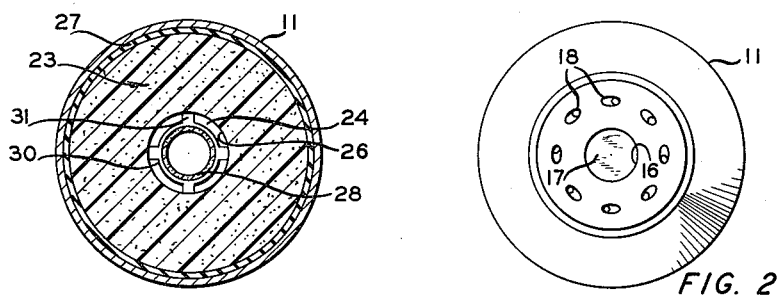
FIGURE 2 is an aft plan view of FIGURE 1.
FIGURE 3 is a cross sectional view of FIGURE 1 taken along the plane indicated.

Referring now to the drawing, in which like parts have been designated with like reference numbers, and initially to FIGURES 1, 2 and 3, one embodiment of the novel combination rocket motor of this invention is illustrated and generally designated 10. Rocket motor 10 comprises a tubular or cylindrical casing 11, made of metal or the like, which defines a cylindrical combustion chamber 12. The aft end of casing 11 is reduced to form a nozzle 13, which may be separate or integral with the casing as shown in the drawing. Nozzle 13 is of the DeLaval type having a converging-diverging passage 14 which communicates with combustion chamber 12. Nozzle 13 is provided with a central or main exhaust opening 16 across which may be placed a suitable starter disc or blowout disc 17, made of metal or the like, which is adapted to rupture or otheriwse fail when a predetermined bursting pressure is established within the combustion chamber 12, thereby allowing gases to escape from chamber 12 at a high velocity. The aft end of nozzle 13 is also provided with a plurality of small, circumferentially spaced orifices or nozzles 18, these orifices being canted at an angle with respect to the nozzle axis so as to cause spinning or rotation of the rocket motor while in flight. These canted nozzles 18 can be temporarily sealed with discs, plugs, or the like, in a manner similar to main nozzle passage 14, and unsealed or opened after the motor is fired. The head end of casing 11 is threaded or otherwise secured to a head closure member 20 having an axial opening in which is threaded or otherwise secured a suitable igniter 21, the particular igniter shown in the drawing having an external cap 25 and a frangible container or cup 22, made of wire mesh or the like the openings of which are coated with suitable rubbery or plastic material which will melt and fail when subjected to heat and pressure, this container projecting axially within the head end of the combustion chamber 12. Igniter container 22 contains suitable ignition material, such as black powder or other pyrotechnic material, in which are embedded one or more electro-responsive members, such as squibs, matches, or the like, which are electrically connected with suitable binding posts in the igniter cap 25 and adapted to be connected to an external electrical system, such as a battery, or the like.

Combustion chamber 12 is loaded with a solid propellant charge generally designated 23. Propellant charge 23 is cylindrical in shape and has an axial perforation 24 extending the length thereof, said perforation being defined by an exposed or unrestricted burning surface 26 upon which ignition and initial burning of the propellant material takes place upon firing igniter 21. Axial perforation 24 can be cylindrical in cross section, as shown in the drawing, or can have any other suitable configuration, such as that of a star. The outer cylindrical surface of propellant charge 23 is adhesively bonded to suitable restricting material 27, such as a sheath of rubber or the like, which can be either non-combustible or have a burning rate substantially slower than that of the propellant making up the charge 23. Both ends of charge 23 are similarly covered with burning restricting material 27.

Axially suspended within axial perforation 24 is a cylindrical tube or tank 28, made of porous or perforated material, such as electrically fused alundum or fused aloxite. Perforated tank 28 can be filled with a liquid combustion reactant, such as liquid fuel, oxidizer, or monopropellant, either before or after assembly within the rocket motor 10. Anywhere along the length of tank 28, preferably at its head, the tank is provided with any suitable filler cap 29 having a small opening sealed with a small frangible or rupturable element or disc. The latter is adapted to fail or otherwise function to relieve internal pressure within tank 28 should the temperature in combustion chamber 12 during operation of the motor become sufficient to expand or vaporize the liquid combustion reactant within the tank. The frangible element also serves to equalize pressure between combustion chamber 12 and the interior of tank 28. If the combustion chamber pressure exceeds that developed centrifugally by the spinning rocket motor, the frangible element ruptures inwardly to balance the pressure. The size of the small opening in cap 29 and the thickness and material of the frangible element can be such that the frangible element will rupture according to either the predetermined vapor pressure of the liquid in tank 28 at the temperature or pressure of the combustion chamber during initial operation of the motor, whichever is lower.

The liquid tank 28 can be supported within the rocket motor by any suitable means, such as by affixing suitable collars 30 to both ends of the tank and connecting thereto a plurality of radiating arms or struts 31 which at their outer ends are affixed to suitable metal rings or plates 32 which can be secured to casing 11 by welding or the like. To prevent longitudinal movement of the propellant assembly within the combustion chamber 12, suitable charge supporting legs 34, springs, or the like, can be inserted within the head end of the combustion chamber between head closure member 21 and head annular plate 32. Any other suitable means for mounting the liquid tank 28 and preventing longitudinal displacement of the propellant charge within the combustion chamber can be employed other than that shown in the drawing and discussed hereinbefore.

Figure 4:
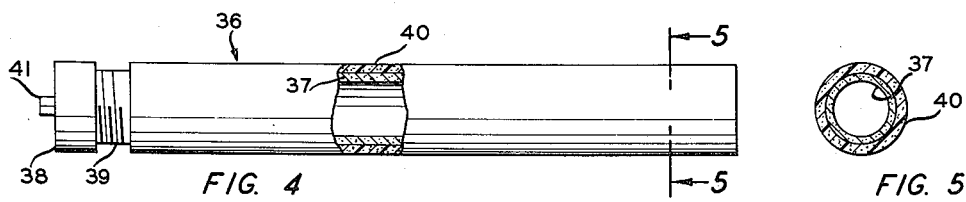
FIGURE 4 is a side elevational view of another embodiment of the liquid fuel, propellant, or oxidizer means shown in FIGURE 1.
Figure 5:
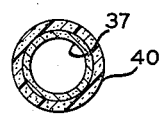
FIGURE 5 is a cross sectional view of FIGURE 4 taken along the plane indicated.

Another embodiment of the liquid combustion reactant tank is shown in FIGURES 4 and 5 and it can be substituted for tank 28 in rocket motor 10 of FIGURES 1 and 2. In this embodiment, tank 36 comprises a porous or perforated tube 37 which is provided with a suitable threaded cap 38 which can be affixed by threads 39 to the tank. Cap 38 can have a built in frangible or rupture disc 41 which is similar in operation and construction as the frangible disc in cap 29 of FIGURE 1. In this embodiment, the outer cylindrical surface of tube 37 is adhesively bonded or otherwise secured to a relatively thin cylindrical layer or coating 40 of solid propellant, such as that propellant making up the charge of FIGURE 1. The coating of solid propellant 40 acts as a means of sealing the pores of perforations in tank 37, and following the firing of the igniter, this layer of propellant will be consumed, thus allowing the liquid combustion reactant within tank 37 to be forced out through the pores or perforations.

Figures 6, 7:
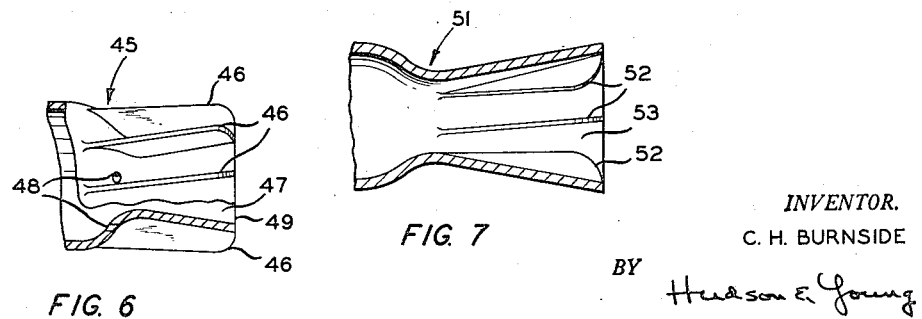
FIGURES 6 and 7 are portions of rocket motors, shown in elevation, and partial section, illustrating other embodiments of the nozzle shown in FIGURE 1.

The rocket motors of this invention can be provided with any other nozzle means for imparting a spin to the motor, other than that shown in FIGURE 1. For example, the rocket motor of FIGURE 1 can instead be provided with any one of the nozzle embodiments shown in FIGURES 6 and 7. In FIGURE 6, the nozzle 45 has a plurality of vanes or fins 46 affixed to its outer surface at an angle with respect to the axis of the rocket motor. In addition to the central main opening in the aft end of nozzle passage 47, a plurality of circumferentially spaced openings or orifices 48 are provided in nozzle 46 in such a manner as to allow the combustion gases generated during flight to flow through these orifices 48, in addition to the central or main opening 49, and impinge on these vanes in such a manner as to cause spin of the rocket motor while it is in flight. In FIGURE 7, nozzle 51 is provided with a plurality of internal vanes or fins 52, which can be made of graphite or the like, disposed within nozzle passage 53 and which are similarly affixed at an angle wtih respect to the axis of the rocket motor so as to allow the gases passing out of the nozzle 53 to impinge on these vanes 52 and impart a spin to the rocket motor.

In operation of the rocket motor 10 shown in FIGURE 1, the rocket motor can be armed by removing the igniter cap 25 from the igniter assembly 21 and connecting the binding posts thereof to a suitable electrical circuit, such as a battery. Upon closing of a suitable switch, electrical current fires the electro-responsive members embedded in the ignition material within frangible cup 22, causing the ignition and burning of this ignition material. The resulting heat and pressure causes the frangible cup or container 22 to break or otherwise rupture and permit the release of the hot ignition products. These ignition products instantaneously propogate within combustion chamber 12, the flow of these products being preferentially directed down axial perforation 24. The heat from these hot ignition products is transferred to the exposed burning surface 26 of solid propellant charge 23, raising said surface to an ignition temperature. Thereafter, the propellant material making up charge 23 begins to burn in relatively concentric layers with the subsequent generation of hot combustion gases. When a predetermined bursting pressure is reached within combustion chamber 12, the starter disc 17 fails or ruptures, thereby permitting the combustion gases generated by the burning solid propellant charge 23 to be released at a high velocity via passage 14 through the central opening 16. These gases also pass through orifices 18 at a high velocity, causing the rotation of the rocket motor 10 while it is in flight. Due to the spin or high angular velocity of the rocket motor 10, the liquid combustion reactant within tank 28 is subjected to high centrifugal force which causes the liquid contents within the tank 28 to be forced out through the walls of the porous or perforated tank into the axial perforation 24 which now contains the hot products of combustion generated by the burning solid propellant charge 23. Where the liquid tank 36 of FIGURES 4 and 5 is used, the layer of solid propellant 40 is also ignited by the firing of the igniter and after it is consumed, the liquid contents within tank 37 is forced therefrom in the same manner as described in regard to tank 28 of FIGURE 1.

The liquid combustion reactant which can be employed in the liquid tank of this invention will depend upon the type of solid propellant being employed and other factors, such as the amount of thrust desired. For example, if the solid propellant contains insufficient oxidizer for its stoichiometric combustion, the liquid within the liquid tank will preferably be a liquid oxidizer such as hydrogen peroxide, white or red fuming nitric acid, ozone, fluorine, or the like. This liquid oxidizer supplements the solid oxidizer in the solid propellant composition so that the available oxidizer present for consumption of the solid propellant will be in stoichiometric ratio. If the solid propellant has a relatively high oxidizer loading such that it contains a sufficient stoichiometric amount of oxidizer necessary to sustain the complete self-combustion of the solid propellant, the liquid within the liquid tank can be a liquid monopropellant. Representative and suitable monopropellants which can be employed include nitromethane, diethylene glycol dinitrate, ethyleneamine, hexanitroethane, solutions of isopropyl nitrate in fuming nitric acid, and the solutions of amine salts in fuming nitric acid disclosed in copending application Serial No. 678,243, filed August 14, 1957, by Homer M. Fox, such as the amine salts, methylamine nitrate, piperidine nitrate, pyridine nitrate, 2-methylpyridine nitrate, N,N,N',N'-tetramethylbutane-1,4-diamine dinitrate, and the like. Alternatively, where the solid propellant contains an excess of oxidizer, the liquid combustion reactant can be a liquid fuel such as aniline, methanol, ethanol, kerosene, gasoline, or any other liquid fuels known in the art.

The solid rocket propellants which are useful in this invention include any of those known in the art, particularly those of the composite type, comprising a major amount of an inorganic oxidizing salt and a minor amount of an organic resin which serves as a fuel and binder for the solid oxidizer. The inorganic oxidizing salts which can be used in preparing the solid propellants representatively include those selected from the group consisting of the ammonium, alkali metal, and alkaline earth metal salts of nitric, perchloric, and chloric acids, and mixtures thereof. Ammonium nitrate and ammonium perchlorate are the preferred oxidizers for use in the solid rocket fuels of this invention. Specific oxidizers include sodium nitrate, potassium perchlorate, lithium chlorate, calcium nitrate, barium perchlorate, and strontium chlorate. Mixtures of oxidizers are also applicable. In the preparation of the solid rocket fuel compositions, the oxidizers are powdered to sizes preferably 10 to 300 microns average particle size. The amount of solid oxidizer employed is usually a major amount of the total composition and is generally in the range between 50 and 90 percent by weight of the total mixture of oxidizer and binder. If desired, however, less than 50 percent by weight of the oxidizer can be used. These propellants containing this amount of oxidizer are generally self-combustible. Where the solid propellants used in this invention have relatively low oxidizer loadings, less than 50 percent by weight of the oxidizer can be used.

The binder materials used in fabricating these solid propellants are preferably natural or synthetic rubbers, such as GR-S, Perbunan, butyl, acrylonitrile/styrene, neoprene, liquid polybutadiene, butadiene/styrene, and like vulcanizable rubbery materials containing unsaturated carbon to carbon bonds. Such propellants can be compression molded, extruded, or otherwise fabricated into the grain or shape desired.

Particular suitable extrudable solid propellant compositions which may be employed are those disclosed and claimed in copending applications Serial No. 284,447, filed April 25, 1952, and Serial No. 561,943, filed January 27, 1956, both by W. B. Reynolds et al. The propellant compositions disclosed in these copending applications comprise a solid inorganic oxidizer, and a binder formed by polymerizing a vinyl-substituted heterocyclic nitrogen base compound with an aliphatic conjugated diene. The following empirical formulas or recipes generally represent the class of extruded solid propellant compositions preferred for the preparation of the propellant charge of this invention.

*Table I*

| Ingredient | Parts per 100 Parts of Rubber | Parts by Weight |
|---|---|---|
| Binder | | 5-50 |
| Copolymer (Bd/MVP) | 100 | |
| Philblack A (a furnace black) | 10-30 | |
| Plasticizer | 10-30 | |
| Silica | 0-20 | |
| Metal Oxide | 0-5 | |
| Antioxidant | 0-5 | |
| Wetting Agent | 0-2 | |
| Accelerator | 0-2 | |
| Sulfur | 0-2 | |
| Oxidizer (Ammonium Nitrate) | | 50-95 |
| Burning Rate Catalyst | | 2-30 |

The polymerizable heterocyclic nitrogen bases which are applicable for the production of polymeric binder materials are those having a vinyl group

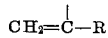
$$CH_2 = \overset{|}{C} - R$$

wherein R is either hydrogen or a methyl group, and are copolymerizable with a conjugated diene. Substituted heterocyclic nitrogen base compounds particularly useful are those selected from the group consisting of pyridine, quinoline, alkyl substituted pyridine and an alkyl substituted quinoline, where the total number of carbon atoms in the nuclear alkyl substituents is not more than 15. Of these, the compounds of the pyridine series are of the greatest commercial interest at present. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25.

These heterocyclic nitrogen bases can be represented by the following structural formulas:

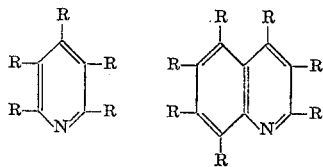 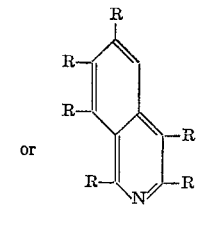

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methylphenyl)-3-vinyl-4-methylpyridine;
3-vinyl-5-(hydroxyphenyl)-pyridine;
2-vinylquinoline;
2-vinyl-4-ethylquinoline;
3-vinyl-6,7-di-n-propylquinoline;
2-methyl-4-nonyl-6-vinylquinoline;
4(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline;

and the like.

The conjugated dienes employed in preparing the rubbery copolymer materials which are utilized as binders are preferably those containing from 4 to 8 carbon atoms per molecule. Representative conjugated dienes which can be employed include 1,3-butadiene, isoprene, 2-methyl-1,3-butadiene, 2,3-dimethyl-1,3-butadiene, piperylene, methylpentadiene, chloroprene, and the like. Various alkoxy derivatives, such as methoxy and ethoxy, and cyano derivatives of these conjugated dienes are also applicable, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, and the like. Instead of using a single conjugated diene, a mixture of conjugated dienes can also be employed, such as a mixture of 1,3-butadiene and isoprene.

Suitable plasticizers useful in preparing these propellant grains include TP-90-B (dibutoxyethoxyethyl formal supplied by Thiokol Corporation); benzophenone; and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable antioxidant is Flexamine, a physical mixture containing 65 percent of a complex diarylamine-ketone reaction product and 35 percent of N,N'-diphenyl-p-phenylenediamine, supplied by Naugatuck Chemical Corporation. A suitable wetting agent is Aerosol–OT (dioctyl solium sulfosuccinate, supplied by American Cyanamid Company). Satisfactory rubber cure accelerators include Philcure 113 (N,N-dimethyl-S-tertiary butylsulfenyl dithiocarbamate; Butyl-8 (a dithiocarbamate-type rubber accelerator supplied by R. T. Vanderbilt Company); and GMF (quinone dioxime, supplied by Naugatuck Chemical Company).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

High energy additives such as finely divided aluminum, magnesium, boron and other finely divided metals can also be used in the propellant compositions of the invention. Said finely divided metals will usually have a particle size within the range of 1 to 50 microns and will usually be used in amounts within the range of 0 to 20 weight percent based on the total propellant composition.

The liquid tanks of this invention, designed to contain the liquid fuel oxidizer or monopropellant, can be fabricated from any porous or perforated material, such as electrically fused alundum, fused aloxite, both of which are forms of alumina ($Al_2O_3$), molded diatomaceous earths, bonded silicas, porous stone, and porous metals, such as porous aluminum and brass, or other materials which are non-reactive with the liquid in the tank. The liquid tank may also be fabricated from any of the normal metals of construction and subsequently drilled to provide the proper number and size of perforations, orifices, or openings. The preferred material to be utilized in the fabrication of the liquid tank is aluminum or a similar light weight metal. When selecting a material of construction for the liquid tank, it is necessary to select a material whose porosity is such that the liquid will not leak out of the tank during handling and storage of the rocket motor. Preferably, a material of a porosity sufficiently small that the pressure drop will be from 100 p.s.i. to 400 p.s.i., or greater, through the wall of the tank should be selected. The optimum material, the desired degree of porosity and the resulting pressure drop will depend, of course, upon the ultimate use of the rocket motor. For long range use, the angular velocity or spin will be very slow. For short range use, the angular velocity will be very high, and by utilizing a large amount of the gases tangentially to provide rotation, a proportionate amount of the gases available must be given up to provide forward thrust.

The angular velocity of a spin-stabilized rocket motor is generally on the order of 180 revolutions per second (10,800 r.p.m.). As such, the force in pounds available due to centrifugal force will be equal to $0.000341\,WRN^2$, wherein W is the mass in pounds of the rotating body, in this case the liquid tank, wherein R is the radius of the rotating mass in feet, and wherein N is the speed at which the body is spinning in revolutions per minute. With a rocket motor such as that shown in FIGURE 1, having a central liquid tank with a diameter of 3½ inches, and a surface area of 679 square inches, the centrifugal force per square inch can be calculated. Assuming that the density of the liquid fuel, propellant, or oxidant is 1.0 and assuming the mass of the central tank itself can be neglected, the force available through centrifugal action will be equal to $0.00314N^2/679$ pounds per square inch or $4.64 \times 10^{-6} N^2$ pounds per square inch.

The following table lists values calculated from the forementioned equation and assumed rotation speeds in r.p.m.

*Table II*

| N (r.p.m.): | Pressure (p.s.i.) |
|---|---|
| 1,000 | 4.64 |
| 2,000 | 18.56 |
| 4,000 | 74.2 |
| 7,000 | 227 |
| 10,000 | 464 |
| 12,000 | 677 |
| 14,000 | 909 |

Various modifications and alterations of this invention will become apparent to those skilled in the art without departing from the scope and spirit of this invention, and it is to be understood that the foregoing discussion and accompanying drawing set forth illustrative embodiments of this invention which are not to be unduly construed to limit this invention.

I claim:
1. A rocket motor comprising a casing defining a combustion chamber, a reaction nozzle, a cylindrical charge of solid rocket propellant loaded within said chamber and having an axial perforation defined by an exposed burning surface, a perforated tube suspended within said perforation and adapted to contain a liquid combustion reactant, and means adapted to impart rotation to said motor during its flight and exert centrifugal force upon said liquid combustion reactant to cause the same to be injected into said perforation.

2. A rocket motor comprising a cylindrical casing defining a combustion chamber, a reaction nozzle secured to the aft end of said casing and communicating with said chamber, a cylindrical charge of solid rocket propellant loaded in said chamber, said charge having its outer cylindrical surface and ends covered with restricting material, said charge having an axial perforation extending the length thereof and defined by an exposed burning surface, a perforated tube axially suspended in said perforation and adapted to contain liquid combustion reactant, and means adapted to impart rotation to said motor during its flight and exert sufficient centrifugal force upon said liquid combustion reactant to cause the same to be injected into said perforation.

3. The rocket motor of claim 2 wherein said means comprise a plurality of canted nozzles in the aft end of said reaction nozzle.

4. The rocket motor of claim 2 wherein said means comprise vanes externally mounted on said reaction nozzle at an angle with respect to the longitudinal axis of said motor, and a plurality of orifices in said reaction nozzle located adjacent the head end thereof.

5. The rocket motor of claim 2 wherein said means comprise vanes internally mounted within said reaction nozzle at an angle with respect to the longitudinal axis of said motor.

6. The rocket motor of claim 2 wherein said solid rocket propellant is of the composite type comprising a major amount of a solid inorganic oxidizing salt and a minor amount of a combustible binder.

7. The rocket motor of claim 6 wherein said inorganic oxidizing salt is selected from the group consisting of the ammonium, alkali metal, and alkaline earth metal salts of nitric, chloric, and perchloric acids.

8. The rocket motor of claim 1 wherein said rocket propellant comprises an oxidizer in a sufficient stoichiometric amount necessary to sustain self-combustion thereof and said liquid combustion reactant is a liquid monopropellant.

9. The rocket motor of claim 1 wherein said solid rocket propellant comprises an oxidizer in an amount in excess of that stoichiometric amount necessary to sustain self-combustion and said liquid combustion reactant is a liquid fuel.

10. The rocket motor of claim 1 wherein said solid rocket propellant comprises an oxidizer in an amount insufficient to sustain self-combustion and said liquid combustion reactant is a liquid oxidizer.

11. A rocket motor comprising a cylindrical casing defining a combustion chamber, a reaction nozzle secured to the aft end of said casing and communicating with said chamber, a cylindrical charge of solid rocket propellant loaded in said chamber, said charge having its outer cylindrical surface and ends covered with restricting material, said charge having an axial perforation extending the length thereof and defined by an exposed burning surface, a perforated tube axially suspended in said perforation and adapted to contain liquid combustion reactant, a layer of solid rocket propellant bonded to the outer cylindrical surface of said tube, and means adapted to impart rotation to said motor during its flight and exert sufficient centrifugal force upon said liquid combustion reactant to cause the same to be injected into said perforation.

References Cited in the file of this patent

UNITED STATES PATENTS

| | | |
|---|---|---|
| 2,129,875 | Rost | Sept. 13, 1938 |
| 2,405,415 | Eksergian | Aug. 6, 1946 |
| 2,412,266 | Hoagland | Dec. 10, 1946 |
| 2,702,984 | Britton et al. | Mar. 1, 1955 |
| 2,750,887 | Marcus | June 19, 1956 |
| 2,774,214 | Malina et al. | Dec. 18, 1956 |
| 2,791,883 | Moore et al. | May 14, 1957 |
| 2,802,332 | Orsino | Aug. 13, 1957 |
| 2,877,504 | Fox | Mar. 17, 1959 |